United States Patent
Bastani et al.

(10) Patent No.: US 11,115,155 B2
(45) Date of Patent: Sep. 7, 2021

(54) SYSTEMS AND METHODS FOR PRIORITIZING PACKET RETRANSMISSION (71) Applicant: Facebook Technologies, LLC, Menlo Park, CA (US)

(72) Inventors: Behnam Bastani, Palo Alto, CA (US); Xiaoguang Wang, Sunnyvale, CA (US); Gang Lu, Pleasanton, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 66 days.

(21) Appl. No.: 16/564,660

(22) Filed: Sep. 9, 2019

(65) Prior Publication Data

US 2021/0075549 A1 Mar. 11, 2021

(51) Int. Cl.
*H04L 1/18* (2006.01)
*H04L 1/16* (2006.01)
*H04L 1/00* (2006.01)

(52) U.S. Cl.
CPC .......... *H04L 1/1809* (2013.01); *H04L 1/0003* (2013.01); *H04L 1/1628* (2013.01); *H04L 1/1642* (2013.01); *H04L 1/1887* (2013.01)

(58) Field of Classification Search
CPC ... H04L 1/1809; H04L 1/0003; H04L 1/1628; H04L 1/1642; H04L 1/188; H04L 1/201
See application file for complete search history.

(56) References Cited

U.S. PATENT DOCUMENTS

| | | | |
|---|---|---|---|
| 6,222,841 B1 * | 4/2001 | Taniguchi | H04L 47/10 370/230 |
| 7,733,868 B2 * | 6/2010 | Van Zijst | H04L 29/12801 370/394 |
| 7,911,956 B2 * | 3/2011 | Schmidt | H04L 65/4007 370/235 |
| 8,077,601 B2 * | 12/2011 | Maze | H04L 47/50 370/216 |
| 8,185,792 B2 * | 5/2012 | Suneya | H04N 21/4425 714/748 |
| 8,363,548 B1 * | 1/2013 | Aboul-Magd | H04L 47/32 370/235 |
| 9,288,334 B2 * | 3/2016 | Thi | H04L 29/06027 |
| 9,414,094 B2 * | 8/2016 | Van Zijst | H04N 19/39 |
| 10,341,047 B2 * | 7/2019 | Howes | H04L 69/321 |
| 2006/0291468 A1 * | 12/2006 | Bopardikar | H04L 65/80 370/392 |
| 2013/0114411 A1 * | 5/2013 | Aboul-Magd | H04L 47/32 370/235 |

* cited by examiner

*Primary Examiner* — Esaw T Abraham
(74) *Attorney, Agent, or Firm* — Foley & Lardner LLP (57) ABSTRACT

Disclosed herein includes a system, a method, and a device for prioritizing packet retransmission. A transmitting device can insert, for each packet of a plurality of packets of a video frame, a sequence number indicative of an order of the corresponding packet among the plurality of packets, into a header of the corresponding packet according to an application layer protocol. The transmitting device can transmit to the receiving device, at a first level of priority, the plurality of packets including the corresponding inserted sequence numbers. The transmitting device can receive an identification of one or more packets to be retransmitted to the receiving device, the identification based on at least the inserted sequence numbers of the one or more packets. The transmitting device can retransmit the one or more packets at a second level of priority that is higher than the first level of priority.

20 Claims, 5 Drawing Sheets

SYSTEMS AND METHODS FOR PRIORITIZING PACKET RETRANSMISSION

FIELD OF DISCLOSURE

The present disclosure is generally related to display systems and methods, including but not limited to systems and methods for prioritizing packet retransmission to reduce latency.

BACKGROUND

In video streaming technologies, a video frame can be transmitted from one device to a receiving device in the form of a plurality of packets and some of the packets can be lost or dropped during transmission between the devices. The receiving device may not be able to process or render the video frame until each of the packets are received. Thus, the receiving device has to wait for the lost packets to be retransmitted. The retransmission of the lost packets can result in delay of video frame(s) provided from the receiving device and negatively impacting user experience.

SUMMARY

Devices, systems and methods for prioritizing packet retransmission (e.g., to reduce latency) are provided herein, for technologies such as but not limited to video streaming. For example, in some embodiments, packets of a video frame can be lost or dropped during transmission between a transmitting device and a receiving device. The transmitting device can identify the lost packets and retransmit the lost packets with a higher or increased priority to reduce a delay in receiving the lost packets at the receiving device. The priority and retransmission of the packets can be accomplished through application level techniques and/or media access level (MAC) driver level techniques.

In some embodiments, for application level techniques, a transmitting device can add or insert a corresponding sequence number (or identifier) in an application level protocol (UDP based) packet header to each packet of a video frame. The sequence number can uniquely map the respective packet to the right location or order in the video frame, and can be protected from or not affected by IP identification or MAC level ordering. The receiving device can receive the packets for the video frame and use the sequence number to determine and identify if any packets were missing, e.g., lost, corrupted or dropped during transmission. In some embodiments, the receiving device can generate a list identifying the missing one or more packets and forward the list to the transmitting device using an increased or the highest priority responsive to reaching or detecting the end of the video frame. The transmitting device can retrieve the missing packets and update a local pending retransmit list or queue to include the missing packets. The transmitting device can retransmit the one or more missing packets with an increased/higher or highest priority to the receiving device.

In some embodiments for MAC driver level techniques, the driver of a first and second MAC device can establish a traffic stream between the transmitting and receiving devices with a determined traffic identifier (TID) range. The traffic stream can be reserved or dedicated for retransmission of data or packets between the first and second MAC devices, and can have an increased/higher or highest priority level. When the driver of the first device (e.g., a transmitting device) detects a retry failure, for example, from a transmit completion status for a video frame, the respective driver can duplicate the missing packet and include the missing packet into a queue of the traffic stream. In some embodiments, the traffic stream can have a unique or separate data queue in the driver to avoid, for example, head-of-line (HOL) blocking. The driver of the first or receiving device can lower a modulation and coding scheme (MCS) rate for the traffic stream priority and/or set an increased or larger retry rate for the traffic stream priority.

In some embodiments, responsive to the end of a current transmit opportunity (TXOP), the higher/highest priority queue can begin retransmitting one or more missing packets through the traffic stream. The driver of the receiving device can access and/or review the packet headers of the retransmitted one or more packets to identify the sequence numbers. The receiving device can maintain a list of receiving packets until each of the expected packets or packets for the corresponding video frame are received. In some embodiments, the receiving device can receive a new packet through the traffic stream and can remove or strip the additional header generated during the duplication process and inserted into the respective packet. The receiving device can forward the video frame to an application responsive to receiving each of the packets for a video frame. Thus, the application level techniques and/or media access level (MAC) driver level techniques described herein can retransmit missing packets with an increased priority and though a more reliable link or connection setting or configuration.

In at least one aspect, a method is provided. The method can include inserting, by a transmitting device for each packet of a plurality of packets of a video frame, a sequence number indicative of an order of the corresponding packet among the plurality of packets, into a header of the corresponding packet according to an application layer protocol. The method can include transmitting, by the transmitting device to the receiving device, at a first level of priority, the plurality of packets of the video frame including the corresponding inserted sequence numbers. The method can include receiving, by the transmitting device, an identification of one or more packets from the plurality of packets to be retransmitted to the receiving device, the identification based on at least the inserted sequence numbers of the one or more packets. The method can include retransmitting, by the transmitting device, the one or more packets at a second level of priority that is higher than the first level of priority.

In some embodiments, the identification of the one or more packets can include a list of the one or more packets. The method can include including, by the transmitting device, a marker frame in a last one of the plurality of packets, to cause the receiving device to complete a determination of which of the plurality of packets are unsuccessfully received by the receiving device. The method can include including, by the transmitting device, a marker frame in a last one of the plurality of packets, to cause the receiving device to send the identification of the one or more packets. The method can include including, by the transmitting device, a marker frame in multiple packets of the plurality of packets to cause the receiving device to send the identification of the one or more packets in multiple parts.

In some embodiments, the method can include identifying, by the transmitting device responsive to receiving the identification, the one or more packets for re-transmission. The method can include inserting, by the transmitting device for each of the one or more packets, a retransmission sequence number into a header of the corresponding packet according to the application layer protocol. In some embodiments, the retransmission sequence number can be based on at least one of: an order of the corresponding packet among the plurality of packets, or an order of the corresponding packet among the one or more packets to be retransmitted.

In at least one aspect, a method is provided. The method can include transmitting, by a transmitting device to a receiving device at a first level of priority, a plurality of packets of a video frame. Each of the packets can include a corresponding sequence number indicative of an order of the corresponding packet among the plurality of packets. The method can include establishing, by the transmitting device with the receiving device, a traffic stream having a second level of priority that is greater than the first level of priority, for re-transmission of packets from the transmitting device to the receiving device. The method can include determining, by the transmitting device, one or more packets of the plurality of packets, to be retransmitted to the receiving device. The method can include configuring, by the transmitting device, a queue of the traffic stream to include the one or more packets to be retransmitted. The method can include retransmitting, by the transmitting device, the one or more packets to the receiving device via the traffic stream at the second level of priority.

In some embodiments, the method can include applying a modulation and coding scheme (MCS) rate for the traffic stream that is lower than a MCS for transmitting the plurality of packets at the first level of priority. The method can include setting a retry limit for the traffic stream that is higher than a retry limit for transmitting the plurality of packets at the first level of priority. The method can include receiving, by the transmitting device from the receiving device, a sequence number for a first packet of the plurality of packets. The method can include determining, by the transmitting device, that the first packet is to be retransmitted according to a first retry limit and retransmitting, by the transmitting device, the first packet at the first level of priority.

In some embodiments, the method can include determining, by the transmitting device, that the retransmission of the first packet to the receiving device is unsuccessful and retransmitting, by the transmitting device in accordance with the first retry limit, the first packet via the traffic stream at the second level of priority. The method can include retransmitting, by the transmitting device via the traffic stream, each of the one or more packets with a second header that includes a sequence number indicative of an order of the corresponding packet among the one or more packets.

The method can include accessing, by the receiving device, the sequence number from the second header and determining, by the receiving device, according to the accessed sequence number from the second header, at least one packet to be retransmitted by the transmitting device in another retransmission. The method can include accessing, by a driver at a media access layer of the receiving device, sequence numbers from headers of packets from the plurality of packets that are received at the receiving device.

In at least one aspect, a non-transitory computer readable medium storing instructions is provided. The instructions when executed by one or more processors can cause the one or more processors to insert, for each packet of a plurality of packets of a video frame, a sequence number indicative of an order of the corresponding packet among the plurality of packets, into a header of the corresponding packet according to an application layer protocol. The instructions when executed by one or more processors can cause the one or more processors to transmit, to the receiving device at a first level of priority, the plurality of packets of the video frame including the corresponding inserted sequence numbers. The instructions when executed by one or more processors can cause the one or more processors to receive an identification of one or more packets from the plurality of packets to be retransmitted to the receiving device. The identification can be based on at least the inserted sequence numbers of the one or more packets. The instructions when executed by one or more processors can cause the one or more processors to retransmit the one or more packets at a second level of priority that is higher than the first level of priority.

In some embodiments, the instructions when executed by one or more processors can cause the one or more processors to include a marker frame in a last one of the plurality of packets, to cause the receiving device to complete a determination of which of the plurality of packets are unsuccessfully received by the receiving device. The instructions when executed by one or more processors can cause the one or more processors to include a marker frame in a last one of the plurality of packets, to cause the receiving device to send the identification of the one or more packets.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

A. Prioritizing Packet Retransmission

Devices, systems and methods for prioritizing packet retransmission (e.g., to reduce latency) are provided herein. The subject matter of this disclosure is directed to a technique for prioritizing packet retransmission, for example, in video streaming to reduce latency, which can be applied to video transmission for an artificial reality (e.g., virtual/mixed/augmented reality) system. In video transmission, packet loss or corruption can occur, such that a compressed video frame is not fully received at a receiving device and cannot be passed to a decoder. The decoder cannot process missing packets, and hence these missing packets may have to be retransmitted by the sending device to the receiving device, to be combined with those packets of the video frame that are successfully received. The packet transmission should be performed quickly and reliably to minimize latency in processing the video frame at the receiving device. The devices, systems and methods described here can increase the priority for retransmitting the missing packet, and may configure the setting(s) of the transmission link for the transmission link to be more reliable.

In some embodiments, an application (e.g., at the application level) of the sending device can incorporate a packet sequence number (e.g., sequence identifier) into the header of each packet, for use by the receiving device to uniquely map each received packet to the right location in the video frame. At the receiving device, an application can identify missing packets using the sequence numbers, and can send a list of missing packets back to the sending device to request retransmission. Responsive to receiving the list, the sending device arranges to retransmit the missing packets at a highest/higher priority. The sending device can add or insert a header (or header information) to the missing packets that indicates a retransmission sequence number for these missing packets, so that the receiver can account for all retransmission packets, and can repeat the process if any are dropped or lost.

In some embodiments, the processing can be performed at the MAC driver level at the sending and receiving devices. For example, the drivers of the two MAC devices can establish a traffic stream (TS) and set a priority level of the traffic stream to a highest level (e.g., 7). The drivers of the two MAC devices can dedicate the traffic stream for retransmission of the missing packets between the respective MAC devices. The traffic stream can be configured to ensure a reliable link, by for example lowering the MCS rate, setting a larger retry limit for the traffic stream priority, and/or establishing a data queue for the traffic stream to avoid head-of-line blocking. At the receiving device, an receive (RX) driver (device driver or wrapper around device driver, at the MAC/second layer) can inspect or snoop into the packet header (at the application layer) of the received packets to verify the sequence numbers. In some embodiments, the additional headers (or header information) can be removed at receiving device, and the retransmitted packets can be combined with the prior received packets of the video frame for processing by the decoder.

Figure 1:
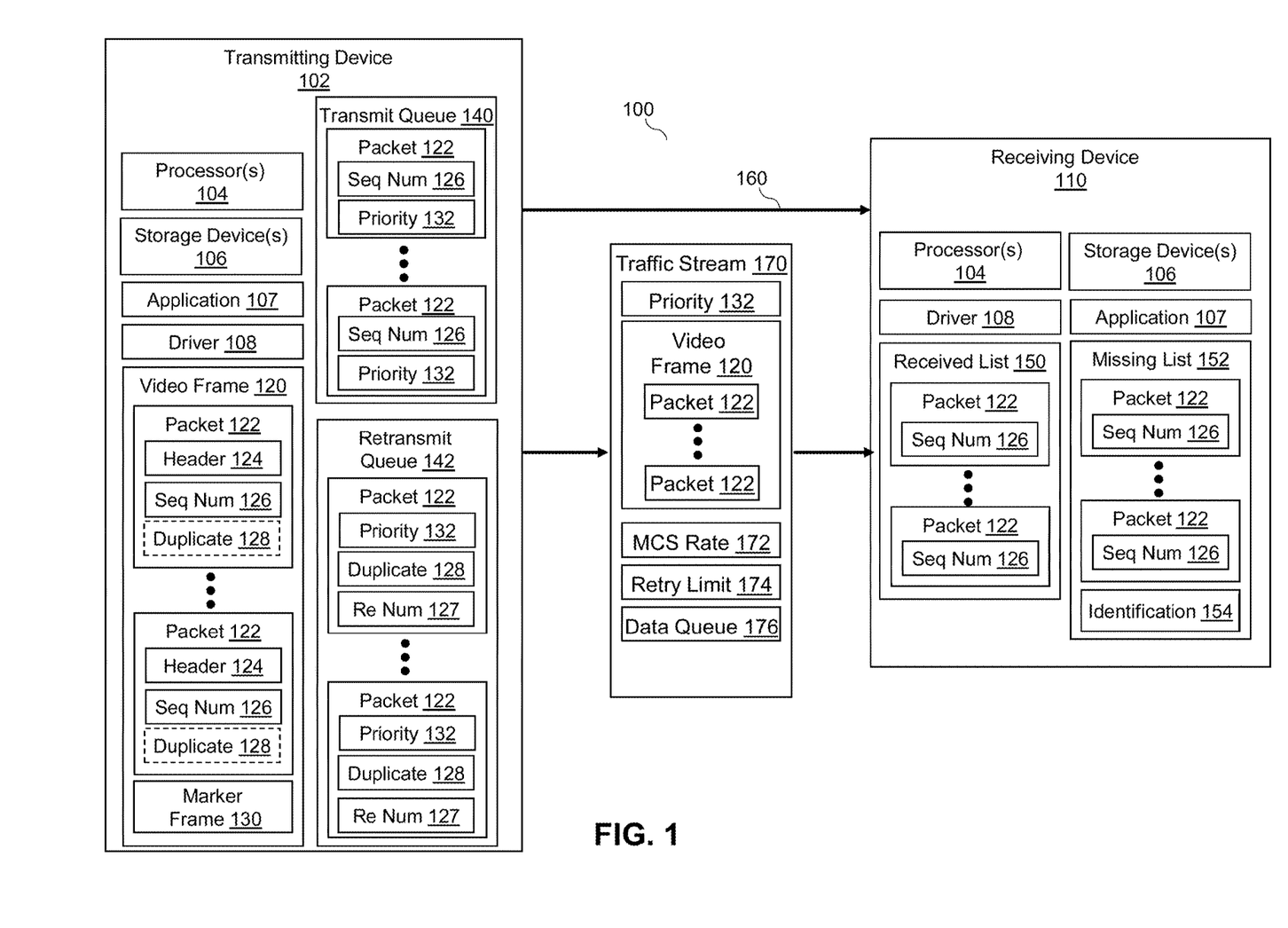
FIG. 1 is a block diagram of an embodiment of a system for prioritizing packet retransmission to reduce latency, according to an example implementation of the present disclosure.

Referring now to FIG. 1, an example system 100 for prioritizing packet retransmission is provided herein. In brief overview, the system 100 can include a transmitting device 102 (transmit (TX) device) configured to transmit a plurality of packets 122 of a video frame 120 to a receiving device (e.g., receive (RX) device) through a traffic stream 170. The receiving device 110 can generate a missing list 152 identifying one or more packets 122 dropped, corrupted or lost during transmission and provide the missing list 152 to the transmitting device 102. The transmitting device 102 can retrieve the one or more missing packets 122, change a priority 132 for the one or more missing packets 122 and retransmit the one or more missing packets 122 with the increased or higher priority 132 to reduce a latency or delay of the receiving device 110 receiving each of the packets 122 for the video frame 120.

Each of the transmitting device 102 and the receiving device 110 can include a computing system or WiFi device. In some embodiments, the transmitting device 102 and/or the receiving device 110 can be implemented, for example, as a wearable computing device (e.g., smart watch, smart eyeglasses, head mounted display), desktop computer, laptop computer, a VR puck, a VR PC, VR computing device or a head mounted or implemented with distributed computing devices. For example, the transmitting device 102 and receiving device 110 can be implemented to provide virtual reality (VR), augmented reality (AR), mixed reality (MR) experience or content. In some embodiments, the transmitting device 102 and receiving device 110 can include conventional, specialized or custom computer components such as processors 104, a storage device 106, a network interface, a user input device, and/or a user output device. In some embodiments, the transmitting device 102 can include or correspond to a transmit device to transmit or stream one or more packets 122 of a video frame 120 to the receiving device 110 or receive device for video streaming technologies. In some embodiments, the receiving device 110 can include or correspond to a transmit device to transmit or stream one or more packets 122 of a video frame 120 to the receiving device 110 or receive device for video streaming technologies. In some embodiments, the transmitting device 102 can control or modify a transmission rate of data or a priority level used to transmit data between the transmitting device 102 and the receiving device 110 via a transmission channel 160, for instance based in part on the type of data or type of content to be transmitted. For example, the transmitting device 102 can select or modify a transmission rate used to transmit audio content, video content or other forms of content such that different forms of content have different transmission rates or the same transmission rates. The priority level of the transmission channel 160 can be a function or combination of the transmission rate, compression rate and/or recovery rate of a transmission channel 160 between the transmitting device 102 and the receiving device 110.

The transmitting device 102 and receiving device 110 can include one or more processors 104. The one or more processors 104 can include any logic, circuitry and/or processing component (e.g., a microprocessor) for pre-processing input data (e.g., video frame data, packet data) for the transmitting device 102 or receiving device 110, and/or for post-processing output data (e.g., missing packet data, queues, lists 140, 142, 150, 152) for the transmitting device 102 or the receiving device 110. The one or more processors 104 can provide logic, circuitry, processing component and/or functionality for configuring, controlling and/or managing one or more operations of the transmitting device 102 or the receiving device 110. For instance, a processor 104 may receive data associated with a video frame 120 to generate a plurality of packets 122 for the video frame 120, generate a transmit queue 140 and/or generate and update a retransmit queue 142. The processor 104 may receive data associated with a plurality of packets 122, identify one or more missing packets 122 lost during transmission, generate a received list 150 and/or generate and update a missing list 152 (of missing packets 122).

The transmitting device 102 and receiving device 110 can include a storage device 106. A storage device 106 can be designed or implemented to store, hold or maintain any type or form of data associated with the transmitting device 102, the receiving device 110, one or more video frames 120, and one or more packets 122. For example, the data can include frame data corresponding to one or more video frames 120 processed by the transmitting device 102 and/or the receiving device 110. The data can include packet data corresponding to one or more packets 122 processed by the transmitting device 102 and/or the receiving device 110. In some embodiments, the data can include one or more transmit queues 140 identifying one or more packets 122 to be transmitted. The data can include one or more retransmit queues 142 identifying one or more packets 122 to be transmitted. The data can include one or more received lists 150 identifying one or more packets 122 received at the transmitting device 102 or receiving device 110. The data can include one or more missing lists 152 identifying one or more packets 122 not (successfully) transmitted at the first transmitting device 102, or not (successfully) received at the receiving device 110, or lost during transmission. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes described herein.

The transmitting device 102 and receiving device 110 can include an application 107. The application 107 can include or be implemented in hardware, or at least a combination of hardware and software. The transmitting device 102 and receiving device 110 can include a device driver 108 (or driver 108). The device driver 108 can include or be implemented in hardware, or at least a combination of hardware and software. The device driver 108 can include or be implemented as a network driver, wireless driver, or a WiFi driver for the transmitting device 102 or the receiving device 110. In some embodiments, the device driver 108 can include software or a program to allow an operating system or processor(s) 104 of the transmitting device 102 or receiving device 110 to communicate with a wireless or network adapter of the transmitting device 102 or receiving device 110. The device driver 108 can be configured to generate a transmit queue 140 of one or more packets 122 to be transmitted between the transmitting device 102 and receiving device 110. In some embodiments, the device driver 108 can be configured to establish and/or maintain a retransmit queue 142 (e.g., retransmit queue) of one or more packets 122 to be retransmitted between the transmitting device 102 and receiving device 110. For example, the device driver 108 can update a priority 132 of one or more packets 122 and update the retransmit queue 142 to indicate the new priority 132 for the respective one or more packets 122. The device driver 108 can be configured to generate a received list 150 identifying or keeping track of one or more packets 122 received at the receiving device 110. In some embodiments, the device driver 108 can be configured to generate a missing list 152 identifying one or more packets 122 lost, corrupted or dropped during transmission between the transmitting device 102 and receiving device 110.

The transmitting device 102 and receiving device 110 can receive or include one or more video frames 120. A video frame 120 can include a waveform, signal, message or data corresponding to video or video streaming technologies used in but not limited to, virtual reality (VR), augmented reality (AR), and/or mixed reality (MR) technologies. The video frame 120 can include or be portioned into a plurality of packets 122. In some embodiments, the transmitting device 102 and/or the receiving device 110 can receive a video frame 120 and partition the video frame 120 into a plurality of packets 122. The packets 122 can include or correspond to slices, portions or individual data units of the video frame 120. The packets 122 can include a header 124 or header data. The header 124 can be a first or initial portion of the respective packet 122, for example, positioned before a body portion of the respective packet 122. The header 124 can include data identifying the respective packet 122, address data, source data and/or destination data. In some embodiments, the header 124 can include a sequence number 126 identifying or mapping the respective packet 122 to the packets 122 location, order or position within the video frame 120. For example, the transmitting device 102 and/or receiving device 110 can assign a sequence number 126 to each packet 122 of the video frame 120. The transmitting device 102 and/or receiving device 110 can insert the sequence number 126 for a packet 122 into the respective packet 122, in such as but not limited to, the header 124 of the packet 122. The sequence number 126 can identify the respective packet 122 position or order within the video frame 120 as compared to the other packets 122 forming the video frame 120.

In some embodiments, the transmitting device 102 can assign a retransmission sequence number 127 to one or more packets 122 identified for retransmission. The transmitting device 102 can insert the retransmission sequence number 127 for a packet 122 into the respective packet 122, in such as but not limited to, the header 124 of the packet 122. In some embodiments, the transmitting device 102 can transmit the retransmission sequence number 127 to the receiving device 110 in a separate transmission channel 160 (e.g., specialized transmission link) between the transmitting device 102 and the receiving device, which can have a different latency (e.g., lower latency) than the transmission channel 160 used to transmit the packet 122 to the receiving device 110. The retransmission sequence number 127 can identify the respective packet 122 position or order within the video frame 120 as compared to the other packets 122 forming the video frame 120. In some embodiments, the retransmission sequence number 127 can identify the respective packet 122 position or order within a retransmit queue 142 including one or more packets 122 identified for retransmission.

In some embodiments, the transmitting device 102 and/or the receiving device 110 can generate and insert a marker frame 130 (e.g., end frame) into the video frame 120 to indicate an end of the video frame 120. For example, the transmitting device 102 and/or the receiving device 110 can insert the marker frame 130 (e.g., end frame) after the last packet 122 of the video frame 120 and thus in a last position or end position of the video frame 120 to indicate an end of the video frame 120 for a device receiving the respective video frame 120. In some embodiments, one marker frame 130 can be inserted into a video frame 120. In some embodiments, two or more marker frames 130 can be inserted into a video frame 120 (e.g., duplicate markers).

In some embodiments, the transmitting device 102 can generate and insert a duplicate frame 128 into a packet 122 to mark the respective packet 122 for retransmission. The duplicate frame 128 can include or corresponds to a second or additional header 124 inserted into the packet 122. The duplicate frame 128 can include or correspond to a duplicate of the header data included in the original header 124 of the packet 122.

The transmitting device 102 and/or the receiving device 110 can assign a priority 132 to each of the packets 122 of the video frame 120 and/or to the video frame 120. The priority 132 can indicate or identify a quality of service or importance metric to prioritize one or more packets 122 over or above one or more other packets 122. In some embodiments, the priority 132 can include a field of a packet 122 identifying which transmit queue 140 (e.g., packet queue) or retransmit queue 142 (e.g., retransmit queue, packet queue) to use. For example, the priority 132 can identify a high priority queue to transmit the respective packet 122. In some embodiments, the priority 132 can include a metric used to transmit the packet 122 from at least one device 102, 110 to a second, different device 102, 110. The transmitting device 102 and/or receiving device 110 can add or insert a field for a packet 122 that includes the priority 132 or priority data for the respective packet 122. In some embodiments, the transmitting device 102 and/or receiving device 110 can insert the priority 132 or priority data for a packet 122 into the header 124 of the respective packet 122 and/or a duplicate frame 128 of the respective packet 122.

The transmitting device 102 can include a transmit queue 140 and a retransmit queue 142. The transmit queue 140 can include or identify one or more packets 122 of a video frame 120 to be transmitted to the receiving device 110 through one or more traffic streams 170. The transmit queue 140 can correspond to a transmit queue of the transmitting device 102 and can order or arrange the packets 122 for transmission based in part on the sequence number 126 and/or a priority 132 of the respective packets 122. The transmit queue 140 can order or arrange the packets 122 for transmission based in part on the order of the packets 122 in the original video frame 120. The retransmit queue 142 can include or identify one or more packets 122 of a video frame 120 to be retransmitted to the receiving device 110 through one or more traffic streams 170. For example, the retransmit queue 142 can include one or more packets 122 dropped, corrupted, unsuccessfully received or lost during an original or previous transmission to the receiving device 110 and thus, identified to be retransmitted to the receiving device 110. The retransmit queue 142 can correspond to a retransmit queue of the transmitting device 102 and can order or arrange the packets 122 for retransmission based in part on the sequence number 126 and/or the priority 132 of the respective packets 122. In some embodiments, the retransmit queue 142 can order or arrange the packets 122 for retransmission based in part on the sequence number 126, the priority 132 and/or the sequence number 126 of each of the packets 122 identified for retransmission.

The receiving device 110 can include a received list 150 and/or a missing list 152. The received list 150 can include or identify one or more packets 122 of a video frame 120 received from the transmitting device 102 through one or more traffic streams 170. The received list 150 can order or arrange the received packets 122 based in part on the sequence number 126 of the respective packets 122 within the video frame 120. For example, the received list 150 can order or arrange the packets 122 based in part on the order of the packets 122 in the original video frame 120. The missing list 152 can include or identify one or more packets 122 of a video frame 120 unsuccessfully transmitted to or received at the receiving device 110 (e.g., dropped, corrupted or lost during transmission to the receiving device 110 and thus, not received at the receiving device 110). For example, the receiving device 110 can identify one or more missing packets 122 based in part on the sequence numbers 126 of the received packets 122. In some embodiments, the missing list 152 can order or arrange the missing packets 122 based in part on the sequence number 126 of the respective missing packets 122.

The transmitting device 102 and the receiving device 110 can be communicatively coupled or connected through one or more transmission channels 160 and/or traffic streams 170. For example, the transmitting device 102 can transmit and/or retransmit one or more packets 122 of a video frame 120 through a transmission channel 160 and/or a traffic stream 170. The transmission channel 160 can include a session or connection between the transmitting device 102 (e.g., application 107, device driver 108) and the receiving device 110 (e.g., application 107, device driver 108). In some embodiments, the transmission channel 160 can include an encrypted and/or secure session or connection between the transmitting device 102 and the receiving device 110. The transmission channel 160 can include one or more priority levels 132. In some embodiments, the transmission channel 160 can include multiple channels 160 each having different priority levels 132.

The traffic stream 170 can include a transmission channel 160, a session or connection between the transmitting device 102 (e.g., application 107, device driver 108) and the receiving device 110 (e.g., application 107, device driver 108). In some embodiments, the traffic stream 170 can include an encrypted and/or secure session or connection between the transmitting device 102 and the receiving device 110. The traffic stream 170 can include one or more priority levels 132. In some embodiments, the traffic stream 170 can include multiple connections each having different priority levels 132. The traffic stream 170 can include or be assigned or configured with a modulation and coding scheme (MCS) rate 172. The transmitting device 102 and/or the receiving device 110 can modify (e.g., increase, decrease) the MCS rate 172 for the traffic stream 170. In some embodiments, the transmitting device 102 and/or the receiving device 110 can lower or decrease the MCS rate 172 for the traffic stream 170 to retransmit one or more packets 122 between the transmitting device 102 and the receiving device 110.

The traffic stream 170 can include or be assigned a retry limit 174. The retry limit 174 can include a value or metric indicating a number of times the transmitting device 102 can attempt to retransmit one or more packets 122 to the receiving device 110. The transmitting device 102 and/or the receiving device 110 can modify (e.g., increase, decrease) the retry limit 174 for the traffic stream 170. In some embodiments, the transmitting device 102 and/or the receiving device 110 can increase the retry limit 174 for the traffic stream 170 to retransmit one or more packets 122 between the transmitting device 102 and receiving device 110. The traffic stream can include or be assigned a data queue 176. The data queue 176 can be unique to the traffic stream and independent of other connections between the transmitting device 102 and the receiving device 110. In some embodiments, the data queue 176 can be used to avoid to reduce network or packet congestion, such as but not limited to, head-of-line (HOL) blocking between the transmitting device 102 and the receiving device 110.

Figure 2A:
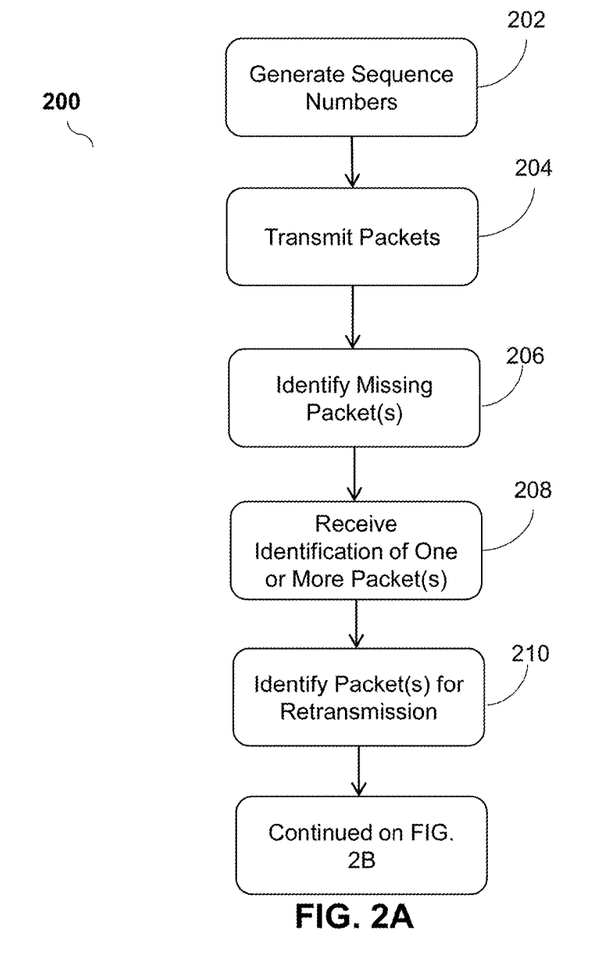
FIGS. 2A-2B include a flow chart illustrating a process or method for prioritizing packet retransmission to reduce latency at an application level, according to an example implementation of the present disclosure.
Figure 2B:
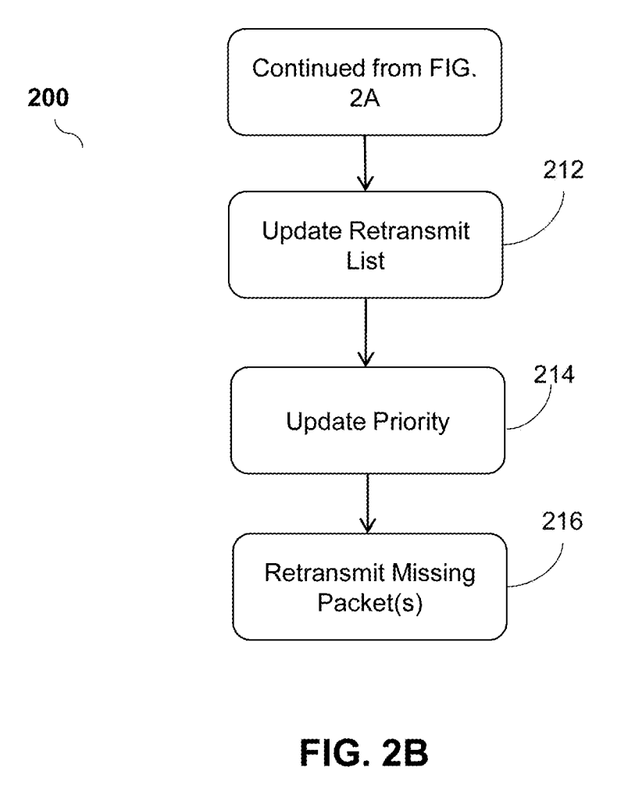

Now referring to FIGS. 2A-2B, a method 200 for prioritizing packet retransmission to reduce latency at an application level is depicted. In brief overview, the method 200 can include one or more of: generating sequence numbers (202), transmitting packets (204), identifying missing packet(s) (206), receiving an identification of one or more packet(s) (208), identifying one or more packets for retransmission (210), updating retransmit list (212), updating priority (214), and retransmitting missing packet(s) (216). Any of the foregoing operations may be performed by any one or more of the components or devices described herein, for example, the transmitting device 102, the receiving device 110 or the device driver 108 of the transmitting device 102 or the receiving device 110.

Referring to 202, and in some embodiments, one or more sequence numbers can be generated. A transmitting device 102 (e.g., first device) can receive or generate a video frame 120 for transmission to a receiving device 110 (e.g., second device). The video frame 120 can include a plurality of packets 122 with each of the packets 122 having a header 124 (e.g., application layer protocol header) to store data or metadata for the video frame 120 and the respective packet 122. The transmitting device 102 or a first application 107 executing on the transmitting device 102 can insert or add a packet sequence number 126 into a header 124 of each packet 122 of a plurality of packets 122 according to an application layer protocol for transmission to a receiving device 110. For example, the first application 107 executing at an application level of the transmitting device 102 and using application level protocol (e.g., UDP based protocol) can generate a sequence number 126 for each packet 122 to uniquely map a respective packet 122 to the right location, order or position within the video frame 120 or indicative of an order of the corresponding packet 122 among the plurality of packets 122 of the video frame 120. In some embodiments, the packet sequence number 126 can be generated using application level protocol such that the packet sequence number 126 is not affected by IP identification and/or MAC level ordering. The packet sequence number 126 can indicate a location, position or order in the video frame 120 for the respective packet 122. For example, the transmitting device 102 can assign a packet sequence number 126 to each of the packets 122 of the video frame 120 based on the location or order of the respective packet 122 in the video frame 120 such that a first packet 122 can be assigned a first packet sequence number 126, a second packet 122 can be assigned a second packet sequence number 126, and an Nth packet 122 can be assigned an Nth packet sequence number 126.

In some embodiments, the first application 107 can insert or include a marker frame 130 or one or more additional frames (e.g., duplicate marker frames) into the video frame 120 to indicate an end of the video frame 120. For example, the first application 107 can insert, send or include the marker frame 130 in or after a last or final packet 122 of the plurality of packets 122 forming the video frame 120. The marker frame 130 can include an instruction or command indicating the end of the video frame 120. In some embodiments, the transmitting device 102 can include the marker frame 130 in a last one of the plurality of packets 122, to cause the receiving device 110 to complete a determination of which of the plurality of packets 122 are or were unsuccessfully received (e.g., received, recognized and/or processed) by the receiving device 110. In some embodiments, the marker frame 130, when received at the receiving device 110, can cause the receiving device 110 to transmit or send an identification 154 of one or more packets 122 dropped, lost or not received at the receiving device 110 to the transmitting device 102. The transmitting device 102 can include a marker frame 130 in one or multiple packets 122 of the plurality of packets 122 to cause the receiving device 110 to send the identification 154 of the one or more packets 122 in multiple parts.

Referring to 204, and in some embodiments, one or more packets can be transmitted. The transmitting device 102 can transmit the plurality of packets 122 of the video frame 120 to the receiving device 110 through at least one transmission channel 160 at a first priority 132 level. The transmitting device 102 can transmit each of the packets 122 with the header 124 and the packet sequence number 126 assigned to the respective packet 122. In some embodiments, the first application 107 executing on the transmitting device 102 can transmit the plurality of packets 122 to a second application 107 executing on the receiving device 110 through the transmission channel 160. The packets 122 can be transmitted based in part on an order or arrangement within the video frame 120 and based in part on their packet sequence numbers 126. For example, the transmitting device 102 can include a transmit queue 140 to order or arrange the plurality of packets 122 for transmission to the receiving device 110. The transmitting device 102 can transmit the packets 122 using the order or arrangement of the packets 122 in the transmit queue 140. The transmitting device 102 can transmit the packets 122 to the receiving device 110 at or having a first level of priority 132.

Referring to 206, and in some embodiments, one or more missing packets can be identified. In some embodiments, during transmission between the transmitting device 102 and the receiving device 110, one or more packets 122 of the video frame 120 can be lost, dropped, corrupted or otherwise not successfully received at the receiving device 110. The receiving device 110 or a second application 107 executing on the receiving device 110 can determine that one or more packets 122 were lost during transmission or should be retransmitted using the sequence numbers 126 inserted into the packets 122 that were received at the receiving device 110.

For example, the second application 107 can identify a marker frame 130 included within the video frame 120 indicating the end of the video frame 120. Responsive to receiving the maker frame 134, the receiving device 110 or the second application 107 can confirm the end of the video frame 120 and determine if any packets 122 were lost or dropped during transmission and if so, which one or more packets 122 were lost or dropped during transmission. For example, the second application 107 can identify each of the sequence numbers 126 for each of the packets 122 received at the receiving device 110 or successfully transmitted from the transmitting device 102 to the receiving device 110 and generate a received list 150. The received list 150 can include each of the packets 122 received at the receiving device 110 and can order the received packets 122 based in part on their respective sequence number 126. In some embodiments, the second application 107 can receive a packet sequence listing including all of the packet sequence numbers 126 for each packet 122 of the video frame 120, for example in a header portion 124 of the video frame 120 or in the header 124 of the first packet 122 of the video frame. The second application 107 can compare the packet sequence numbers 26 from the received list 150 to the packet sequence listing to determine which packet sequence numbers are missing in the received list 150 and identify which one or more packets 122 were lost during transmission and/or not successfully received at the receiving device 110.

In some embodiments, the second application 107 on the receiving device 110 can use the received list 150 to determine which packet sequence numbers are missing in the received list 150 and identify which one or more packets 122 were lost during transmission and not received at the receiving device 110. For example, the second application 107 can identify a first packet sequence number 126 and a last or final sequence number 126 in the received list 150 and can determine if any packet sequence numbers 126 are missing or not included in the received list 150 between the first packet sequence number 126 and the last or final sequence number 126 in the received list 150. The second application 107 can generate a missing list 152 that includes one or more packets 122 that were transmitted from the transmitting device 102 and not received at the receiving device 110 using the identified missing packet sequence numbers 126. The missing list 152 can list, order or arrange the missing packets 122 within the missing list 152 based in part on the packet sequence numbers 126 of the missing packets 122. The receiving device 110 or second application 107 can generate an identification 154 that identifies the one or more packets 122 included within the missing list 152. The identification 154 can include a script, command, message or instruction to indicate or identify the one or more missing packets 122 and/or one or more sequence numbers for the one or more missing packets 122. The one or more missing packets 122 can include a list of packets 122.

Referring to 208, and in some embodiments, an identification of one or more packets can be received. In some embodiments, a list of packets including the one or more missing packets can be received. The transmitting device 102 can receive an identification 154 of one or more packets 122 from the plurality of packets 122 (e.g., missing packets) to be retransmitted to the receiving device 110. The identification 154 can include or be based in part on the inserted sequence numbers 126 of the one or more packets 122. In some embodiments, the identification 154 can include the missing list 152 generated by the receiving device 110. For example, the receiving device 110 or the second application 107 can transmit the missing list 152 to the transmitting device 102 or the first application 107.

The second application 107 can transmit the identification 154 with a second level of priority 132. The second level of priority 132 can be greater than the first level of priority 132. For example, the second application 107 can transmit the identification 154 with the second level of priority 132 or an increased or highest priority 132 responsive to determining or confirming the end of the video frame 120 and generating the missing list 152. In some embodiments, the second application 107 can transmit the identification 154 with a higher priority 132 or greater priority 132 (e.g., second level of priority) than the priority 132 (e.g., first level of priority) used to transmit the packets 122 from the transmitting device 102 to the receiving device 110. In some embodiments, second application 107 can transmit the identification 154 with the same priority 132 as the priority 132 used to transmit the packets 122 from the transmitting device 102 to the receiving device 110.

Referring to 210, and in some embodiments, one or more packets for retransmission can be identified. The transmitting device 102 or the first application 107 can identify and/or retrieve the one or more packets 122 to be retransmitted responsive to receiving the identification 154 and/or using the missing list 152. In some embodiments, the packets 122 of the video frame 120 can be stored in a storage device 106 of the transmitting device 102. The first application 107, responsive to receiving the identification 154, can identify the one or more packets 122 to be retransmitted based in part on the packet sequence numbers 126 included within the identification 154. The first application 107 can retrieve the packets 122 to be retransmitted from the storage device 106 of the transmitting device 102.

In some embodiments, the transmitting device 102 or the first application 107 can insert or add a retransmission sequence number 127 into each of the one or more packets 122 identified for retransmission into a header 124. For example, the first application 107 can insert the retransmission sequence number 127 into an application layer protocol header 124 of the respective packet 122 or according to an application layer protocol. The retransmission sequence number 127 can be based on one of an order or location of the corresponding packet 122 among the plurality of packets 122 or an order or location of the corresponding packet 122 among the one or more packets 122 to be retransmitted. The first application 107 can assign the retransmission sequence number 127 based in part on the packet sequence number 126 for the respective packet 122 and/or a location or order within a retransmit queue 142 including one or more packets 122 identified for retransmission. For example, the first application 107 can assign the retransmission sequence number 127 based on one or more other packets 122 identified for retransmission such that the packets 122 identified for retransmission maintain an original order with respect to the packet 122 positions within the original video frame 120. The retransmission sequence number 127 can identify the respective packet 122 positions within a retransmit queue 142 including one or more packets 122 identified for retransmission. The retransmission sequence number 127 for any particular Packet can be the same or different from the packet sequence number 126 assigned to the respective packet 122.

Referring to 212, and in some embodiments, a retransmit list can be updated. The transmitting device 102 or the first application 107 can generate and/or update a retransmit queue 142 to include the one or more packets 122 identified for retransmission. The first application 107 can list, organize or arrange the packets 122 in the retransmit queue 142 based in part on the retransmission sequence number 127 assigned to the respective packets 122.

Referring to 214, and in some embodiments, a priority can be updated. In some embodiments, the transmitting device 102 or first application 107 can update the retransmit queue 142 (e.g., a local retransmission list) to include the one or more packets 122 identified for retransmission with a second level of priority 132. The second level of priority 132 can be selected based in part on a previous or first level of priority 132, a priority of other packets 122 identified for transmission and/or priority properties of the transmission channel 160. The transmitting device 102 or the first application 107 can increase or modify a priority of the packets 122 identified for transmission or a priority of the transmission channel 160 used to retransmit the packets 122 from the transmitting device 102 to the receiving device 110 from the first level of priority to the second level of priority. In some embodiments, the first application 107 can increase the priority 132 from a previous level or set the priority 132 of the one or more packets 122 identified for retransmission to a highest or greatest priority 132. In some embodiments, the priority 132 can be a function or combination of the transmission rate, compression rate and/or recovery rate of a transmission channel 160 between the transmitting device 102 and the receiving device 110. The transmitting device 110 or the first application 107 can modify or update the priority 132 to change or modify a transmission rate of a transmission channel 160 between the transmitting device 102 and the receiving device 110. The priority 132 can be selected based in part on the type of data or type of content to be transmitted. For example, the transmitting device 102 or first application 107 can select or modify a transmission rate used to transmit audio content, video content or other forms of content such that different forms of content have different transmission rates, the same transmission rates, different priority 132 or the same priority 132.

The transmitting device 102 or the first application 107 can assign the second level of priority 132 such that the second level of priority 132 of the one or more packets 122 is greater than a level of priority 132 of other packets 122 (e.g., not packets 122 from the video frame 120, packets 122 from a different video frame 120) included in the retransmit queue 142 (e.g., local retransmission list). For example, the first application 107 can modify the priority 132 of the packets 122 identified for retransmission such that the packets 122 are moved ahead of or before other packets 122 included within the retransmit queue 142.

Referring to 216, and in some embodiments, one or more missing packets can be retransmitted. The transmitting device 102 or the first application 107 can retransmit the one or more packets 122 using a second level of priority that is higher than the first level of priority. The first application 107 can retransmit the packets 122 included within the retransmit queue 142 based in part on their retransmit sequence number 127 and priority 132 of the respective packet 122. The receiving device 110 or the second application 107 of the receiving device 110 can receive the one or more previously missing packets 122 through the transmission channel and update a received list 150. The second application 107 can determine if any of the retransmitted packets 122 were dropped, corrupted or lost during transmission. If one or more packets were dropped, corrupted or lost during retransmission, the method 200 can return to 206 to identify the missing packets 122.

Figure 2C:
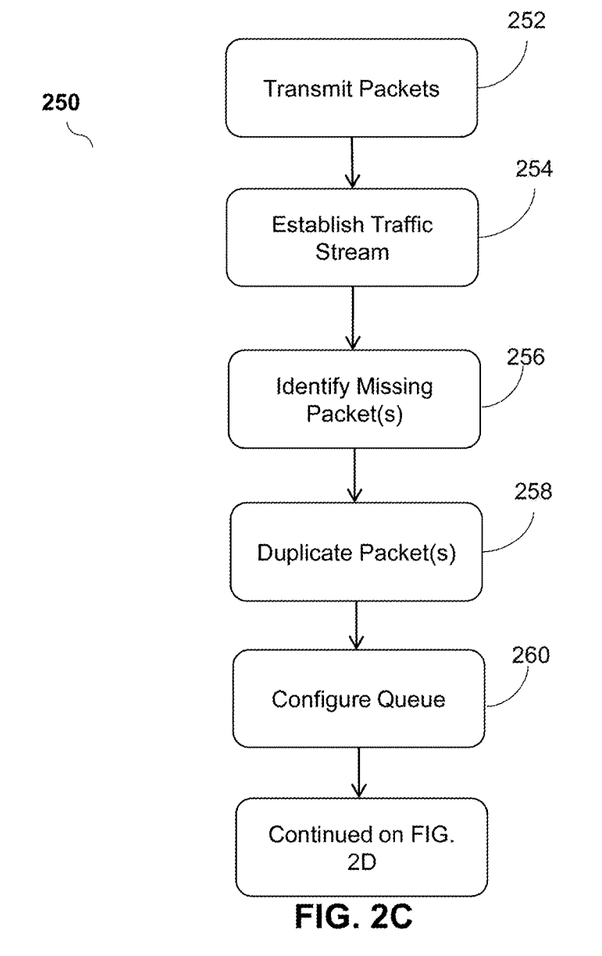
FIGS. 2C-2D include a flow chart illustrating a process or method for prioritizing packet retransmission to reduce latency at a MAC driver level, according to an example implementation of the present disclosure.
Figure 2D:
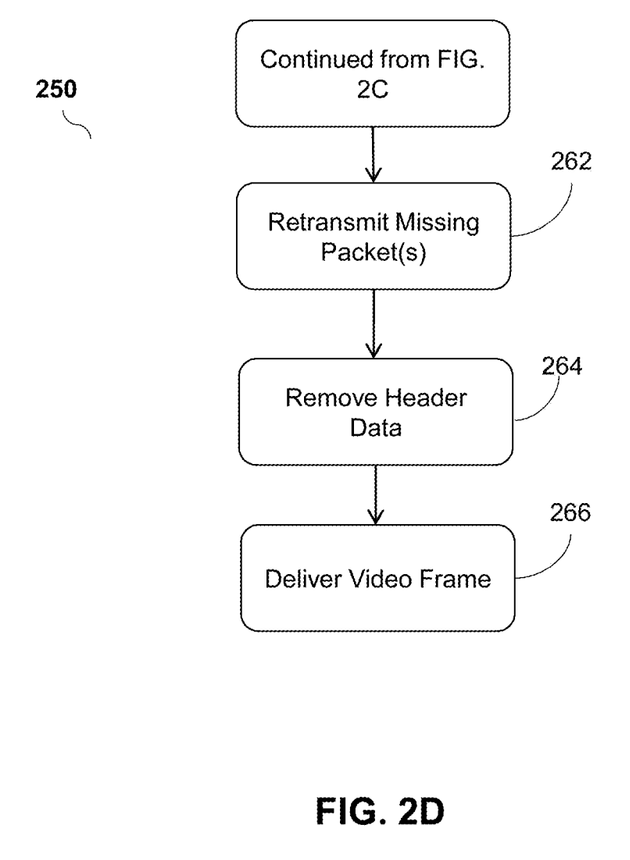

Now referring to FIGS. 2C-2D a method 250 for prioritizing packet retransmission (e.g., to reduce latency) at a MAC driver level is depicted. In brief overview, the method 250 can include one or more of: transmitting packets (252), establishing a traffic stream (254), determining packet(s) for retransmission (256), duplicating packet(s) (258), configuring a queue of the traffic stream (260), retransmitting missing packet(s) (262), removing header data (264), and delivering video frame (266). Any of the foregoing operations may be performed by any one or more of the components or devices described herein, for example, the transmitting device 102, the receiving device 110, the application 107 of the transmitting device 102 or the receiving device 110, or the device driver 108 of the transmitting device 102 or the receiving device 110. In some embodiments, the of the foregoing operations may be performed by or between the first device driver 108 of the transmitting device 102 and the second device driver 108 of the receiving device 110, for example, at a MAC driver level of the transmitting device 102 and the receiving device 110.

Referring to 252, and in some embodiments, one or more packets can be transmitted. The transmitting device 102 can transmit a plurality of packets 122 of a video frame 120 to a receiving device 110 through at least one transmission channel 160 and at a first level of priority 132. In some embodiments, the device driver 108 of the transmitting device 102 can transmit the plurality of packets 122 of the video frame 120 to the device driver 108 of the receiving device 110 through at least one traffic stream 170.

The transmitting device driver 108 can insert or add a packet sequence number 126 to each packet 122 of the video frame 120 prior to transmitting the packets 122. The transmitting device driver 108 can insert the packet sequence number 126 in a header 124 of the respective packet 122. Each of the packets 122 can include a corresponding sequence number indicative of an order of the corresponding packet 122 among the plurality of packets 122 of the video frame 120. The sequence number 126 for each packet 122 can uniquely map the respective packet 122 to the right location or position within the video frame 120. For example, the transmitting device driver 108 can assign the packet sequence number 126 to indicate a location, position or order in the video frame 120 for the respective packet 122. The transmitting device driver 108 can assign the packet sequence number 126 to each of the packets 122 of the video frame 120 based on the position or order of the respective packet 122 in the video frame 120 such that a first packet 122 can be assigned a first packet sequence number 126, a second packet 122 can be assigned a second packet sequence number 126, and an Nth packet 122 can be assigned an Nth packet sequence number 126. The transmitting device driver 108 can transmit the plurality of packets 122 based in part on an order or arrangement within the video frame 120 and based in part on their packet sequence numbers 126.

Referring to 254, and in some embodiments, a traffic stream can be established. The transmitting device 102 or the first device driver 108 executing on the transmitting device 102 can establish a traffic stream 170 to a receiving device 110 and/or to a second device driver 108 executing on the receiving device 110. The traffic stream 170 can be established having a second priority level 132 and the traffic stream 170 can be dedicated for transmission and/or re-transmission of packets 122 from the transmitting device 102 to the receiving device 110. The second level of priority 132 can be greater than the first level of priority 132. In some embodiments, the first device driver 108 can establish the traffic stream 170 to the second device driver 108 to establish a connection between the transmitting device 102 and the receiving device 110 at the MAC driver level between the devices 102, 110. The first device driver 108 can set or associate a priority 132 (e.g., second level of priority) of the traffic stream 170 to a highest or greatest level (e.g., priority 7). In some embodiments, the first device driver can set or associate the priority 132 of the traffic stream 170 such that it is higher or greater than a priority of one or more other/prior connections established to the receiving device 110 or other devices remote from the transmitting device 102. In some embodiments, the first device driver 108 can reserve the traffic stream 170 for retransmission of one or more packets 122 of a video frame 120 between the transmitting device 102 and the receiving device 110 and use one or more other traffic streams or connections to transmit packets 122 to the receiving device 110.

Referring to 256, and in some embodiments, one or more packets for retransmission can be determined. The transmitting device 102 or the first device driver 108 can determine or identify one or more packets 122 of the plurality of packets 122 to be retransmitted to the receiving device 110. In some embodiments, the transmitting device 102 can determine one or more packets 122 need to be retransmitted based in part on a transmit completion status of the one or more packets 122 or the video frame 120. The first device driver 108 can detect an initial transmission or one or more retry attempts that has failed, from a transmit completion status for the video frame 120. For example, the first device driver 108 can maintain a transmit queue 140 that includes a completion status for a video frame 120 to be transmitted to a receiving device 110 or a completion status of the individual packets 122 of the video frame 120. The completion status can include or indicate "to be transmitted", "in process" (e.g., during transmission), "failed" and/or "completed" for instance. The completion status can stay in an in process status until each packet 122 of a video frame 120 is received at the intended receiving device 110. In some embodiments, the first device driver 108 can change a status of a packet 122 to failed in response to determining the packet 122 was not received at the receiving device 110.

The first device driver 108 can retry or retransmit one or more packets 122 one or more times in response to determining the one or more packets were not received at the receiving device 110. For example, the receiving device 110 can determine the sequence number 126 from a packet header 124 for a first packet 122 of the plurality of packets 122 and provide an identification 154 of the determined sequence number 126 or including the determined sequence number 126 of the first packet 122. The transmitting device 102 can update the completion status for the first packet 122 to indicate completion of a transmission or retransmission of a packet or video frame. The transmitting device 102 or the receiving device 110 can determine that a first or second packet 122 or one or more packets 122 of the plurality of packets 122 is to be retransmitted according to the provided identification 154. For example, the transmitting device 102 can determine that the sequence number for the first or second packet 122 or one or more packets 122 of the plurality of packets 122 of the video frame was not included in the identification 154 that indicates which packets were received at the receiving device 110. The transmitting device 102 can attempt to retry transmitting the first or second packet 122 or one or more missing packets 122 at the first level of priority by a determined number of retry times. The determined number of retry times can include or correspond to a retry limit 174 (e.g., 1 retry attempt, 2 retry attempts, more than 2 retry attempts). In some embodiments, the transmitting device 102 can determine that a first packet 122 is to be retransmitted according to a first retry limit 174 and the transmitting device 102 can retransmit the first packet 122 at the first level of priority 132. The transmitting device 102 can retry transmitting the first or second packet 122 or one or more missing packets 122 until the retry limit 174 or threshold is reached. The status of the second packet 122 or one or more packets 122 can indicate still in process or failed. The first device driver 108 can detect the retry or multiple retries failed from the transmit completion status for the video frame 120 or the individual packets 122. In some embodiments, the receiving device 110 or second device driver 108 can determine that the second packet 122 was not received at the receiving device 110 because a sequence number 126 for a first or second packet 122 was not included in the sequence numbers 126 for the received packets 122. The receiving device 110 can determine that the first or second packet 122 was not received at the receiving device 110 because the sequence number 126 following the sequence number of the identified first packet 122 was not included in the sequence numbers 126 for the received packets 122. The transmitting device 102 or first device driver 108 can determine that the sequence number for the first or second packet 122 or one or more packets 122 of the plurality of packets 122 of the video frame was not included in the identification 154 that indicates which packets were received at the receiving device 110.

Referring to 258, and in some embodiments, one or more packets can be duplicated (or prepared, scheduled) for retransmission. The transmitting device 102 or the first device driver 108 can determine the one or more packets 122 and duplicate or generate the respective packets 122 for retransmission. The duplicated packets 122 can be the same as the original packets 122 and can include the sequence number 126 in the header 124 of the respective packet 122. In some embodiments, the duplicated packets 122 can be different from the original packets 122 and include a different sequence number such as a retransmission sequence number 127 in the header 124 of the respective packet 122. The transmitting device 102 or the first device driver 108 can inset or add the retransmission sequence number 127 into each of the one or more packets 122 identified for retransmission into the packet header 124 of the respective packet 122.

The retransmission sequence number 127 can be based on one of the location or order of the corresponding packet 122 among the plurality of packets 122 or a location or order of the corresponding packet 122 among the one or more packets 122 to be retransmitted. The first device driver 108 can assign the retransmission sequence number 127 based in part on the packet sequence number 126 for the respective packet 122 and/or an order or location within or amongst the one or more packets 122 identified for retransmission. The retransmission sequence number 127 can identify the respective packets 122 position within a queue 176 of the traffic stream 170. The retransmission sequence number 127 can the same or different from the packet sequence number 126 assigned to the respective packet 122.

Referring to 260, and in some embodiments, a queue of the traffic stream can be configured. The transmitting device 102 or the first device driver 108 can configure a queue 176 of the traffic stream 170. The first device driver 108 can configure the queue 176 to include the one or more packets 122 identified for retransmission. In some embodiments, the first device driver 108 can provide a retransmit queue 142 of the transmitting device 102 that includes the one or more packets 122 to be transmitted to the queue 176 of the traffic stream 170. The first device driver 108 can list, organize or arrange the packets 122 in the queue 176 based in part on a retransmission sequence number 127 assigned to the respective packets 122 or an original sequence number 126 assigned to the respective packets 122.

In some embodiments, the transmitting device 102 or first device driver 108 can update or modify the queue 176 to include the one or more packets 122 identified for retransmission with a second level of priority 132. The second level of priority 132 can be selected based in part on a previous or first level of priority 132, a priority of other packets 122 identified for transmission and/or priority properties of the traffic stream 170. The transmitting device 102 or the first device driver 108 can increase or modify a priority of the packets 122 identified for retransmission to match or correspond to the second level of priority of the traffic stream 170. In some embodiments, the transmitting device 102 or the first device driver 108 can assign the second level of priority 132 such that the second level of priority 132 of the one or more packets 122 is greater than a level of priority 132 of other packets 122 (e.g., not packets 122 from the video frame 120, packets 122 from a different video frame 120) included in the queue 176 of the traffic stream 170.

Referring to 262, and in some embodiments, one or more missing packets can be retransmitted. The transmitting device 102 or the first device driver 108 can retransmit the one or more packets 122 to the receiving device 110 via the traffic stream 170 at the second level of priority 132. In some embodiments, the first device driver 108 can determine that the retransmission of the first packet 122 or the second packet 122 to the receiving device 110 is unsuccessful and the transmitting device 102, in accordance with the first retry limit 174, can retransmit the first packet 122 or the second packet 122 via the traffic stream at the second level of priority 132.

The first device driver 108 can update or verify the properties of the traffic stream 170 to retransmit the one or more packets 122. For example, the first device driver 108 can apply a modulation and coding scheme (MCS) rate for the traffic stream 170 that is lower than a MCS for transmitting the plurality of packets 122 at the first level of priority 132. In some embodiments, the first device driver 108 can reduce the MCS rate 172 for the traffic stream 170. The first device driver 108 can select the MCS rate 172 of the traffic stream 170 based in part on the properties of the traffic stream 170 (e.g., bit rate, bandwidth, quality) and/or the properties of the one or more packets 122 to be retransmitted (e.g., size of each packet, number of packets). In some embodiments, the first device driver 108 can set a retry limit 174 for the traffic stream 170 that is higher than a retry limit for transmitting the plurality of packets 122 at the first level of priority 132. The first device driver 108 can increase a retry limit 174 for the traffic stream 170. For example, the first device driver 108 can increase or change the retry limit 174 for retransmitting one or more packets at the second level of priority 132 such that the retry limit 174 is different or greater than a retry limit 174 for retransmitting one or more packets at the first level of priority 132 (e.g., not via the traffic stream 170).

The first device driver 108 can retransmit the packets 122 included within the queue 176 based in part on their retransmit sequence number 127 and the second level of priority 132 of the respective packet 122. The first device driver 108 can retransmit, via the traffic stream 170, each of the one or more packets 122 with a second header 124 that includes a retransmit sequence number 127 or a sequence number 126 indicative of an order of the corresponding packet 122 among the one or more packets 122. For example, the transmitting device 102 or the first device driver 108 can retransmit the one or more packets 122 each including a second header 124 that includes the sequence number 127 for the retransmission (e.g., retransmission sequence number) of the corresponding packet 122 via the traffic stream 170. In some embodiments, the transmitting device 102 can determine that the retransmission of a second packet 122 to the receiving device is unsuccessful and can retransmit the second packet 122 via the traffic stream 170 at the second level of priority 132 and with the reduced MCS rate 172 and increased retry limit 174.

The receiving device 110 or the second device driver 108 can receive the one or more packets 122 through the traffic stream 170 and verify the respective packets 122. The second device driver 108 can determine if any of the retransmitted packets 122 were dropped or lost during transmission. If one or more packets were dropped or lost during retransmission, the method 200 can return to 256 to identify the missing packets 122. In some embodiments, the second device driver 108 can access the sequence number 127 from the second header 124 and determine, according to the accessed sequence number 127 from the second header 124, at least one packet 122 to be retransmitted by the transmitting device 102 in another retransmission. The second device driver 108 of the receiving device 110 can access, at a media access layer of the receiving device 110, sequence numbers 126, 127 from headers 124 of packets 122 from the plurality of packets 122 that are received at the receiving device 110.

The second device driver 108 can determine that each of the retransmitted packets 122 were received at the receiving device 110. For example, the receiving device 110 or the second device driver 108 can generate a received list 150 including sequence numbers 126 or one or more packets 122 of the plurality of packets 122 received at the receiving device 110. The receiving device 110 or the second device driver 108 can maintain the received list 150 until each packet 122 of the plurality of packets 122 is received at the receiving device 110. The second device driver 108 can update the received list 150 after or subsequent to each retry or transmission of one or more packets 122 to indicate packets 122 that have been received at the receiving device 110. In some embodiments, the second device driver 108 can access the sequence number 127 from the second header 124 and determine, according to the accessed sequence number 127 from the second header 124, that each of the one or more packets 122 retransmitted via the traffic stream 170 are received at the receiving device 110.

Referring to 264, and in some embodiments, header data can be removed. The receiving device 110 or the receiving device driver 108 can remove a duplicate or retransmission header 128 from the at least one packet 122 responsive to receiving the at least one packet 122 through the traffic stream 170. The receiving device driver 108 can receive the one or more retransmitted packets 122 and determine if the packets 122 included the retransmission header 128 or duplicate header 128 added by the transmitting device driver 108, for example, during the duplication process. The receiving device driver 108 can remove or strip the retransmission header 128 or duplicate header 128 from the one or more packets 122 added by the transmitting device driver 108. The receiving device driver 108 can transmit or otherwise send a notification to the transmitting device driver 108 indicating that the retransmitted one or more packets 122 have been received.

Referring to 266, and in some embodiments, a video frame can be delivered. The receiving device 110 or the receiving device driver 108 can determine if any of the retransmitted packets 122 were dropped or lost during retransmission. For example, the receiving device driver 108 can add the retransmitted packets to the received list 150 on the receiving device 110 and identify if each of the packet sequence numbers 126 for the video frame 120 are included within the received list 150. If one or more packets were dropped, corrupted or lost during retransmission, the method 250 can return to 256 to determine packets for retransmission or identify the missing packets 122.

If the receiving device driver 108 determines that each of the packets 122 of the video frame 120 have been received at the receiving device 110, the receiving device can provide or deliver the video frame 120 to at least one application 107 executing on or connected to the receiving device 110. In some embodiments, the receiving device driver 108 can stream the video frame 120 to the application 107 by delivering the plurality of packets 122 to the application 107. In some embodiments, the receiving device driver 108 can deliver the received packets 122 to the application 107 until a next or subsequent frame 120 or packet 122 is identified or determined as missing.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   inserting, by a transmitting device for each packet of a plurality of packets of a video frame, a sequence number indicative of an order of the corresponding packet among the plurality of packets, into a header of the corresponding packet according to an application layer protocol;
   transmitting, by the transmitting device to the receiving device, at a first level of priority, the plurality of packets of the video frame including the corresponding inserted sequence numbers;
   receiving, by the transmitting device, an identification of one or more packets from the plurality of packets to be retransmitted to the receiving device, the identification based on at least the inserted sequence numbers of the one or more packets;
   selecting, by the transmitting device, a second level of priority for the one or more packets to be retransmitted to the receiving device, the second level being higher than the first level; and
   retransmitting, by the transmitting device, the one or more packets at the second level of priority.

2. The method of claim 1, wherein the identification of the one or more packets includes a list of the one or more packets.

3. The method of claim 1, comprising:
   including, by the transmitting device, a marker frame in a last one of the plurality of packets, to cause the receiving device to complete a determination of which of the plurality of packets are unsuccessfully received by the receiving device.

4. The method of claim 3, comprising:
   including, by the transmitting device, a marker frame in a last one of the plurality of packets, to cause the receiving device to send the identification of the one or more packets.

5. The method of claim 1, comprising:
   including, by the transmitting device, a marker frame in multiple packets of the plurality of packets to cause the receiving device to send the identification of the one or more packets in multiple parts.

6. The method of claim 1, comprising:
   identifying, by the transmitting device responsive to receiving the identification, the one or more packets for re-transmission.

7. The method of claim 1, comprising:
   inserting, by the transmitting device for each of the one or more packets, a retransmission sequence number into a header of the corresponding packet according to the application layer protocol.

8. The method of claim 7, wherein the retransmission sequence number is based on at least one of: an order of the corresponding packet among the plurality of packets, or an order of the corresponding packet among the one or more packets to be retransmitted.

9. A method comprising:
   transmitting, by a transmitting device to a receiving device at a first level of priority, a plurality of packets of a video frame, each of the packets including a corresponding sequence number indicative of an order of the corresponding packet among the plurality of packets;
   selecting, by the transmitting device, a second level of priority that is greater than the first level of priority, for a traffic stream to establish with the receiving device for re-transmission of packets from the transmitting device to the receiving device;
   determining, by the transmitting device, one or more packets of the plurality of packets, to be retransmitted to the receiving device;
   configuring, by the transmitting device, a queue of the traffic stream to include the one or more packets to be retransmitted; and
   retransmitting, by the transmitting device, the one or more packets to the receiving device via the traffic stream at the second level of priority.

10. The method of claim 9, comprising:
    applying a modulation and coding scheme (MCS) rate for the traffic stream that is lower than a MCS for transmitting the plurality of packets at the first level of priority.

11. The method of claim 9, comprising:
    setting a retry limit for the traffic stream that is higher than a retry limit for transmitting the plurality of packets at the first level of priority.

12. The method of claim 9, comprising:
    receiving, by the transmitting device from the receiving device, a sequence number for a first packet of the plurality of packets.

13. The method of claim 12, comprising:
    determining, by the transmitting device, that the first packet s is to be retransmitted according to a first retry limit; and
    retransmitting, by the transmitting device, the first packet at the first level of priority.

14. The method of claim 13, comprising:
    determining, by the transmitting device, that the retransmission of the first packet to the receiving device is unsuccessful; and
    retransmitting, by the transmitting device in accordance with the first retry limit, the first packet via the traffic stream at the second level of priority.

15. The method of claim 9, comprising:
    retransmitting, by the transmitting device via the traffic stream, each of the one or more packets with a second header that includes a sequence number indicative of an order of the corresponding packet among the one or more packets.

16. The method of claim 15, comprising:

accessing, by the receiving device, the sequence number from the second header; and determining, by the receiving device, according to the accessed sequence number from the second header, at least one packet to be retransmitted by the transmitting device in another retransmission.

17. The method of claim 9, comprising:

accessing, by a driver at a media access layer of the receiving device, sequence numbers from headers of packets from the plurality of packets that are received at the receiving device.

18. A transmitting device comprising:

one or more processors configured to:

insert, for each packet of a plurality of packets of a video frame, a sequence number indicative of an order of the corresponding packet among the plurality of packets, into a header of the corresponding packet according to an application layer protocol;

transmit, to the receiving device at a first level of priority, the plurality of packets of the video frame including the corresponding inserted sequence numbers;

receive an identification of one or more packets from the plurality of packets to be retransmitted to the receiving device, the identification based on at least the inserted sequence numbers of the one or more packets;

selecting, by the transmitting device, a second level of priority for the one or more packets to be retransmitted to the receiving device, the second level being higher than the first level; and retransmit the one or more packets at a second level of priority that is higher than the first level of priority.

19. The transmitting device of claim 18, wherein the one or more processors are further configured to:

include a marker frame in a last one of the plurality of packets, to cause the receiving device to complete a determination of which of the plurality of packets are unsuccessfully received by the receiving device.

20. The transmitting device of claim 18, wherein the one or more processors are further configured to:

include a marker frame in a last one of the plurality of packets, to cause the receiving device to send the identification of the one or more packets.

* * * * *